United States Patent
Suzuki (12) 
(10) Patent No.: US 6,381,263 B1
(45) Date of Patent: Apr. 30, 2002

(54) RECEIVING METHOD AND RECEIVING APPARATUS

(75) Inventor: Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/320,941

(22) Filed: May 27, 1999

(30) Foreign Application Priority Data

May 29, 1998 (JP) .............................. 10-150330

(51) Int. Cl.$^7$ ............................... H04B 1/707
(52) U.S. Cl. .................. 375/148; 375/260; 370/203; 370/210
(58) Field of Search ................ 375/141, 142, 375/143, 144, 145, 147, 148, 149, 150, 152, 260; 370/203, 210

(56) References Cited

U.S. PATENT DOCUMENTS 5,732,113 A * 3/1998 Schmidl et al. ............. 375/355
6,192,026 B1 * 2/2001 Pollack et al. .............. 370/203

* cited by examiner

*Primary Examiner*—Don N. Vo
(74) *Attorney, Agent, or Firm*—Jay H. Maioli (57) ABSTRACT

A cycle prefix component of a received orthogonal frequency division multiplex (OFDM) modulation signal is extracted, the extracted cycle prefix component is subjected to Fourier transformation, an absolute value square of the component is calculated, periodicity of an envelope of the absolute value square value is detected, and a frequency error of the OFDM modulation signal is determined on the basis of the phase of the periodicity. Thus, the detection of a frequency offset at a reception time of the OFDM modulation signal can be performed by a simple arrangement.

10 Claims, 11 Drawing Sheets

RECEIVING METHOD AND RECEIVING APPARATUS

BACKGROUND OF THE INVENTION

1. Field of the Invention

The present invention relates to a receiving method and a receiving apparatus for receiving a signal subjected to an orthogonal frequency division multiplexing (to be referred to as an OFDM hereinafter) modulation and, more particularly, to a technique for detecting a frequency error of a received signal.

2. Description of the Related Art

As one of modulation systems used when digital data having a relatively large capacity is transmitted in a wireless mode or the like, OFDM modulation is practically used. The OFDM modulation system is a system for transmitting transmission data as a multi-carrier which is dispersed into a plurality of sub-carriers. This modulation system can efficiently transmit a large-capacity data in a wireless mode.

Figure 1:
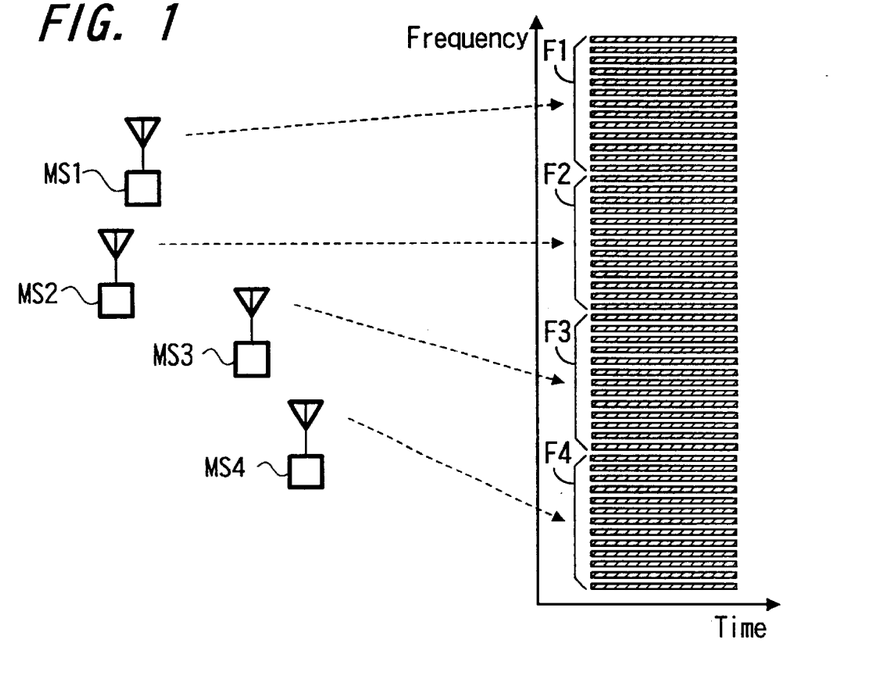
FIG. 1 is an explanatory diagram showing an example of a reception state of an OFDM signal at a base station.

As a wireless transmission state of a signal subjected to the OFDM modulation, there may be such a case that one unit of OFDM modulation signal is continuously transmitted in a predetermined frequency band. For example, as shown in FIG. 1, in a wireless telephone system, it is assumed that OFDM modulation signals transmitted in a wireless mode from a plurality of mobile stations MS1, MS2, MS3, and MS4 are subjected to a receiving process by a base station. In this case, the OFDM modulation signals from the respective mobile stations MS1 to MA4 are transmitted as multi-carrier signals respectively using different bands F1 to F4, and all the bands F1 to F4 are subjected to a receiving process by the base station. A system in which multi-connection between the base station and a plurality of surrounding mobile stations is made by using OFDM modulation waves as described above has been proposed.

Figure 2:
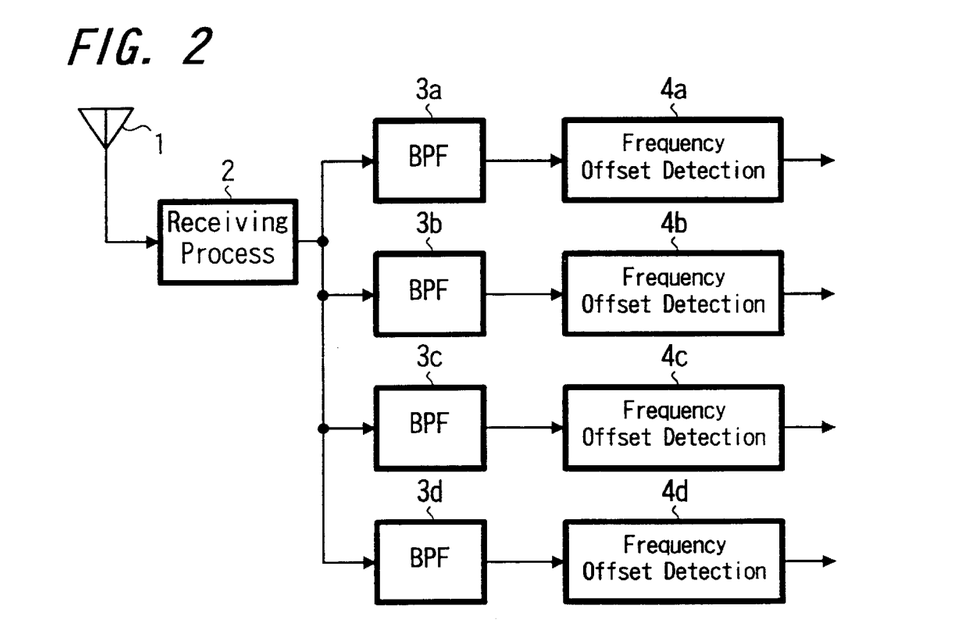
FIG. 2 is a block diagram showing an example of the arrangement of a conventional base station.

By the way, as shown in FIG. 1, when signals transmitted from a plurality of mobile stations are subjected to a receiving process by a base station, a frequency offset of respective transmission signals must be detected. FIG. 2 is a diagram showing an example of a circuit arrangement for detecting a frequency offset in a conventional base station. This example is a case wherein the frequency offsets of signals from the four mobile stations MS1 to MS4 shown in FIG. 1 are detected. A receiving processor 2 connected to an antenna 1 performs the signals of the transmission bands at once, and then the received signals are supplied to four band-pass filters 3a, 3b, 3c, and 3d having different passing bands, respectively. In this case, the passing bands of the band-pass filters 3a to 3d are set for the transmission bands F1 to F4 shown in FIG. 1, respectively.

Outputs from the band-pass filters 3a to 3d are supplied to different frequency offset detection circuits 4a, 4b, 4c, and 4d, respectively. The frequency offsets of transmission signals from the four mobile stations MS1 to MS4 are independently subjected to a detection process by the frequency offset detection circuits 4a to 4d, respectively. On the basis of amounts of frequency offsets detected by the frequency offset detection circuits 4a to 4d, the following correction process is performed. That is, the reception frequencies of signals transmitted from the mobile stations are corrected, or data for correcting a frequency offset is transmitted to a corresponding mobile station.

Figure 3:
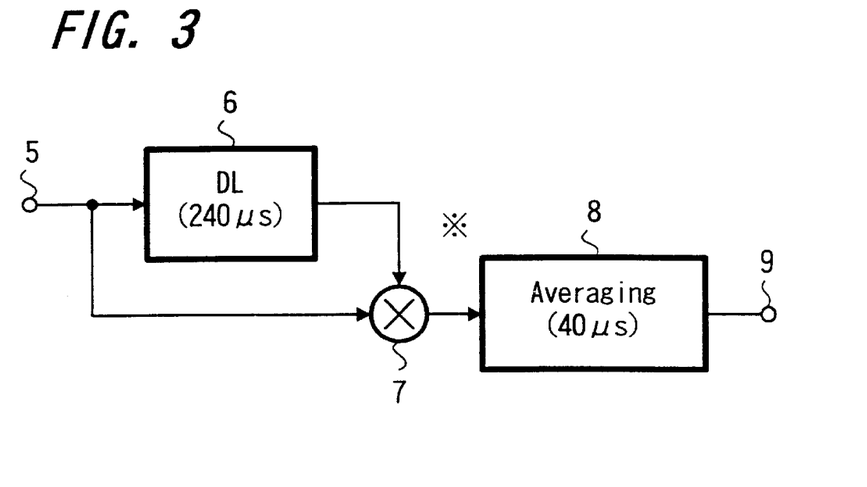
FIG. 3 is a block diagram showing an example of a conventional frequency offset detection circuit.

As a frequency offset detection process performed in each of the frequency offset detection circuits 4a to 4d, for example, a detection process using a cycle prefix component included in an OFDM modulation signal is known. An example of a frequency offset detection arrangement using the cycle prefix component is shown in FIG. 3. A signal from a terminal 5 at which an output from each of the band-pass filters 3a to 3d can be obtained is supplied to a multiplier 7 through a delay circuit 6 for delaying the signal for a predetermined period, and a signal obtained at the terminal 5 is directly supplied to the terminal 5. Both the signals are subjected to a multiplying process. In this case, an amount of delay of the delay circuit 6 is set to be an inherent amount of delay included in the cycle prefix component. The relationship between the cycle prefix component and the amount of delay will be described later. The signal delayed by the delay circuit 6 is a complex signal. A multiplying process of a complex conjugate is performed in the multiplier 7.

An output from the multiplier 7 is supplied to an averaging circuit 8 to calculate an average in a predetermined period, and the average value is supplied to an output terminal 9 as a value which is in proportion to a frequency offset value. The period in which averaging is performed by the averaging circuit 8 is set to be a period corresponding to one length (time) of a cycle prefix component, for example. With such a process, a value which is in proportion to the frequency offset value is obtained at the output terminal 9.

A cycle prefix component included in an OFDM modulation signal will be described below. First, a complex sine wave is defined by a function rot() shown by Equation (1) equation.

$$\text{rot}(s) = \exp(j2\pi s) \quad (1)$$

At this time, an OFDM modulation signal before windowing for transmission can be described as represented by the following Equation (2) equation.

$$x(t) = \sum_{k=a}^{b} x_k \text{rot}(k f_c t) \quad (2)$$

Heare, symbol $x_k$ denotes a transmission symbol (transmission symbol put on a kth sub-carrier), and symbol $f_c$ denotes a sub-carrier interval. The OFDM modulation signal represented by Equation (2) and obtained before windowing is performed can also expressed as represented by the following Equation (3).

$$x(t + T_c) = \sum_{k=a}^{b} x_k \text{rot}(k f_c (t + T_c)) \quad (3)$$

$$= \sum_{k=a}^{b} x_k \text{rot}(k f_c t + f_c T_c)$$

$$= \sum_{k=a}^{b} x_k \text{rot}(k f_c t) = x(t)$$

Figure 4:
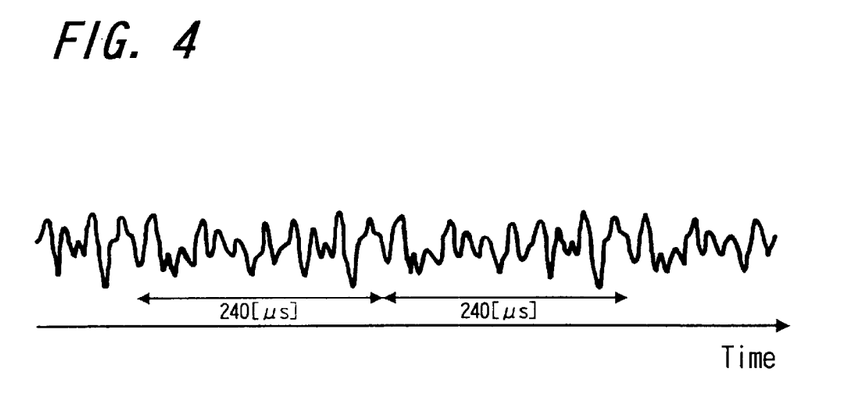
FIG. 4 is a waveform diagram showing an example of an OFDM signal before windowing is performed.

In this case, $T_c = 1/f_c$ is established, and the OFDM modulation signal is represented by a periodic function of a period Tc depending on the sub-carrier interval $f_c$. More specifically, for example, when fc=4.1666 [kHz]=100 [kHz]/24, $T_c$=240 [μs]. In this case, an OFDM signal obtained before windowing is performed has, for example, as shown in FIG. 4, a signal waveform having a periodicity of 240 [μs].

When the OFDM modulation signal is to be transmitted, the process for multiplying windowing data (time waveform) called a transmission window. A signal obtained by multiplying the windowing data is represented by the following equation. In this equation, w(t) denotes windowing data (window).

$$y(t) = \sum_{k=a}^{b} x_k rot(kf_c t)w(t) \quad (4)$$

Figure 5:
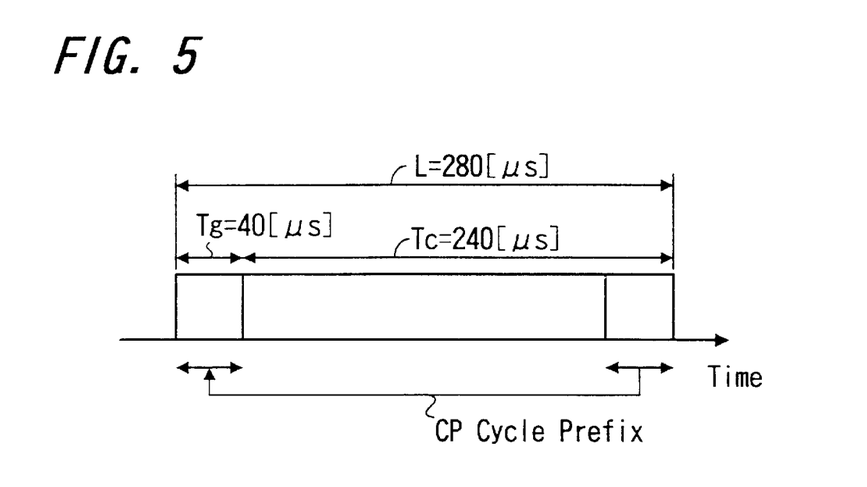
FIG. 5 is an explanatory diagram showing an example of windowing data at a transmission time.

FIG. 5 is a diagram showing an example of windowing data. As described above, when $T_c$=240 [μs], windowing data based on the time is generated. In this case, for simplifying the description, a window is represented by an rectangular wave, and the window is set to be a window in a period L (280 [μm]) obtained by adding a period $T_g$ (40 [μs]) to the above-mentioned period $T_c$ (240 [μs]). As an OFDM modulation wave multiplied by the window, an OFDM wave in the period $T_g$ at the start portion of one unit of window and an OFDM wave in the period $T_g$, at the end portion, having a time width equal to that of the period $T_g$ at the start portion have completely an equal waveform. This modulation wave is called a cycle prefix. This cycle prefix corresponds to a cycle prefix CP shown in FIG. 5.

The OFDM wave multiplied by the windowing data is represented by the following equation when a frequency offset of v [Hz] is put on the OFDM wave.

$$y(t) = \sum_{k=a}^{b} x_k rot(kf_c t)w(t)rot(vt) \quad (5)$$

With this signal, when only a cycle prefix portion is regarded, the cycle prefix portion is represented by the following equation.

z(t)=(c(t)+c(t−T_c))rot(vt)=c(t)rot(vt)+c(t−T_c)rot(v(t−T_c))rot(vT_c) (6)

In this case, if d(t)=c(t)rot(vt) and a=vT_c, the cycle prefix portion can be described as represented by the following equation.

z(t)=d(t)+d(t−T_c)rot(a) (7)

More specifically, signals d(t) having equal waveforms are repeated such that the signals are separated from each other by 240 μs and rotated by a phase a [rotation]. In a conventional frequency offset detection circuit for the OFDM wave, a frequency error was detected by using the cycle prefix component. That is, when the frequency offset detection circuit described above and shown in FIG. 3 detects the frequency offset of the OFDM wave multiplied by windowing data shown in FIG. 5, 240 μs is set as an amount of delay of the delay circuit 6, and 40 μs is set as a period in which averaging is performed by the averaging circuit 8. Correlation between the cycle prefix component at the start portion and the cycle prefix component at the end portion is detected by this circuit to detect a frequency error. The following [Equation 8] represents a state wherein a frequency error is detected by the circuit in FIG. 3, and a frequency error can be detected by calculating the phase of the value of a complex number q.

$$q = \int_{t=240\,[\mu s]}^{t=280\,[\mu s]} d^*(t - 240\,[\mu s])d(t - 240\,[\mu s])rot(a)dt \quad (8)$$

$$= rot(a) \int_{t=240\,[\mu s]}^{t=240\,[\mu s]} |d(t - 240\,[\mu s])|^2 dt$$

$$= rot(a) * (\text{real\_value})$$

Figure 14:
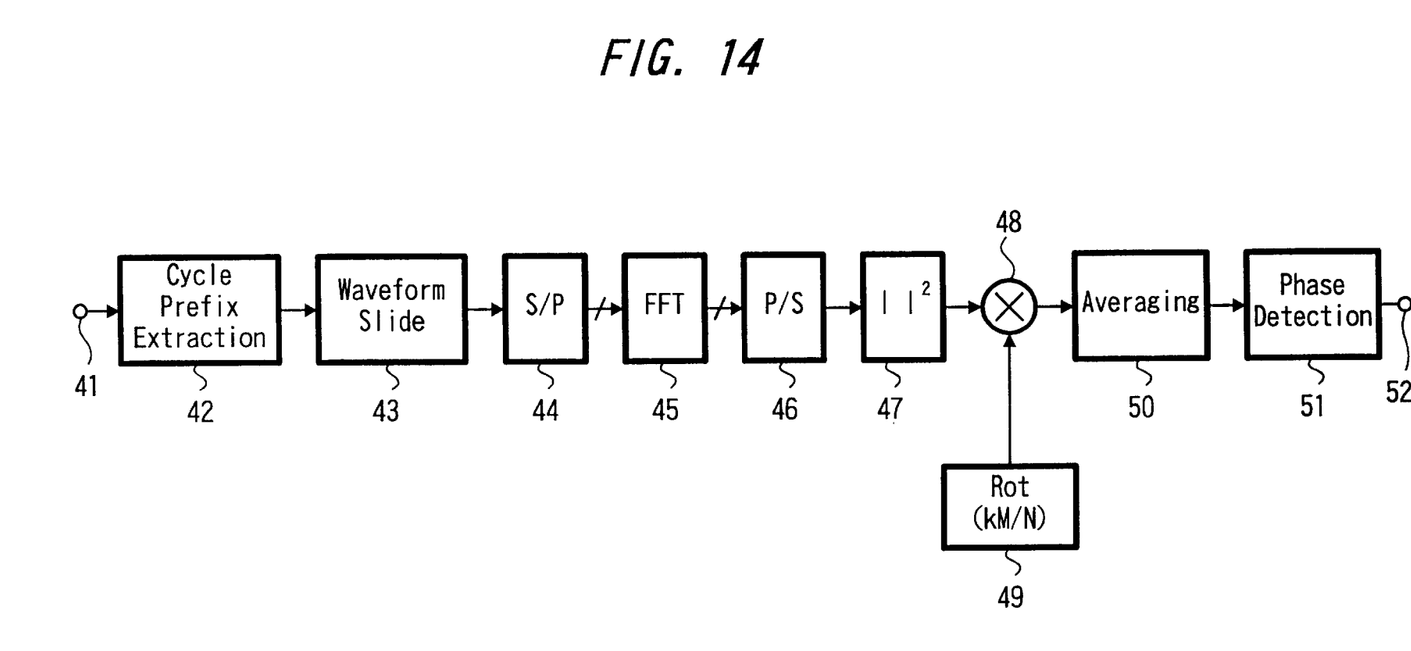
FIG. 14 is a block diagram showing an example of a frequency offset detection circuit according to the second embodiment of the present invention.

By the way, as shown in FIG. 1, when multi-connection is performed by an OFDM wave, as shown in FIG. 2, the frequency offset detection circuits are required for respective receiving system of signals from the mobile stations, and a base station must have a plurality of the frequency offset detection circuits each shown in FIG. 14. The base station is disadvantageously complex in arrangement.

SUMMARY OF THE INVENTION

It is an object of the present invention to make it possible to detect a frequency offset in reception state of an OFDM modulation signal with a simple arrangement.

In order to solve this problem, a receiving method according to the present invention extracts a cycle prefix component of a received OFDM modulation signal, Fourier transforms the extracted cycle prefix component, calculates an absolute value square of the component, detects periodicity of an envelope of the absolute value square value, and determines a frequency error of the OFDM modulation signal on the basis of the phase thereof.

According to the receiving method of the present invention, the phase value of the value of the periodicity of the envelope of the detected absolute value square value becomes a value which is in proportion to a frequency error of the OFDM modulation signal, and the frequency error can be determined.

A receiving apparatus according to the present invention comprises a cycle prefix component extraction means for extracting a cycle prefix component of a received OFDM modulation signal, a Fourier transformation means for Fourier transforming the extracted cycle prefix component by the extraction means, an absolute value square means for calculating an absolute value square of the component transformed by the Fourier transformation means, periodicity detection means for detecting periodicity of an envelope from an output from the absolute value square means, and a phase detection means for detecting a phase of an output from the periodicity detection means.

According to the receiving apparatus of the present invention, the phase value detected by the phase detection means becomes a value which is in proportion to a frequency error of the OFDM modulation, and the frequency error can be determined on the basis of the phase value.

DESCRIPTION OF THE PREFERRED EMBODIMENTS

A first embodiment of the present invention will be described below with reference to FIGS. 6 to 13.

In this embodiment, the present invention is applied to a wireless communication device for performing a receiving process for an OFDM modulation signal. At first, a transmission arrangement for the OFDM modulation signal will be described below with reference to FIG. 9. In this arrangement, a signal is modulated into an OFDM signal in which the number of sub-carriers is 96, and a sub-carrier interval is set to be 4.1666 kHz. Data of transmission symbols (in this case, one unit is constituted by 96 symbols) obtained from an input terminal 111 is supplied to a serial/parallel conversion circuit 102 to be converted into 96-point parallel data. The parallel data is supplied to a zero insertion circuit 103 to be added with 32-point 0 data, thereby obtaining 128-point parallel data. The 128-point parallel data are supplied to an inverse Fourier transformation circuit (IFFT circuit) 104 having 128 points. The resultant data is subjected to an orthogonal transform process for transforming a time axis into a frequency axis by using inverse fast Fourier transformation. In this case, the process of adding 32-point 0 data in the zero insertion circuit 103 is performed for the following reason. That is, the number of points is set to be a power of 2 (in this case, 128) to make the arrangement of an inverse Fourier transformation process circuit simple.

A conversion output from the inverse Fourier transformation circuit 104 is output to a parallel/serial conversion circuit 105 to be converted into serial data, and the serial data is supplied to a transmission windowing data multiplying circuit 106 to be multiplied by transmission windowing data. As the transmission windowing data, for example, as shown in FIG. 5, a predetermined period $T_c$ (in this case 240 μs) is set for 128-point data, and a 21-point period $T_g$ (in this case, 40 μs) for setting a cycle prefix CP is added. In this case, the cycle prefix CP of the 21-point period $T_g$ at the start portion and the cycle prefix CP of the 21-point period $T_g$ at the end portion have completely the same waveform. For descriptive convenience, the windowing data is shown as a rectangular wave. However, in fact, the windowing data is not a rectangular wave in many cases (the same as in the case of transmission windowing data to be described later).

Transmission data multiplied by windowing data in the transmission windowing data multiplying circuit 106 is supplied to a digital/analog converter 107 to be converted into an analog signal at a sampling cycle based on a predetermined-frequency clock (clock of 533.33 kHz which is a value obtained by multiplying a sub-carrier interval of 4.1666 kHz by the number of points, i.e., 128) obtained from a terminal 108. The converted signal is supplied to a modulation circuit 109 to be subjected to a transmission modulation process. The modulated signal is supplied from a terminal 110 to a transmission process circuit (not shown), and the frequency of the signal is converted into a predetermined transmission frequency. The frequency-converted signal is transmitted in a wireless mode.

An arrangement for receiving the OFDM modulation signal transmitted in a wireless mode as described above is shown in FIG. 11. A signal having a predetermined frequency band is received, and the signal which is frequency-converted into an intermediate-frequency signal or the like is obtained from an input terminal 111. The signal obtained at the input terminal 111 is supplied to a demodulation circuit 112 to be subjected to a reception modulation process. The demodulated signal is supplied to a analog/digital converter 113 to be converted into digital data in a sampling cycle based on a predetermined-frequency clock (in this case, 533.33 kHz: this clock has a frequency equal to that of a clock at a transmission process) obtained from a terminal 114.

Figure 10:
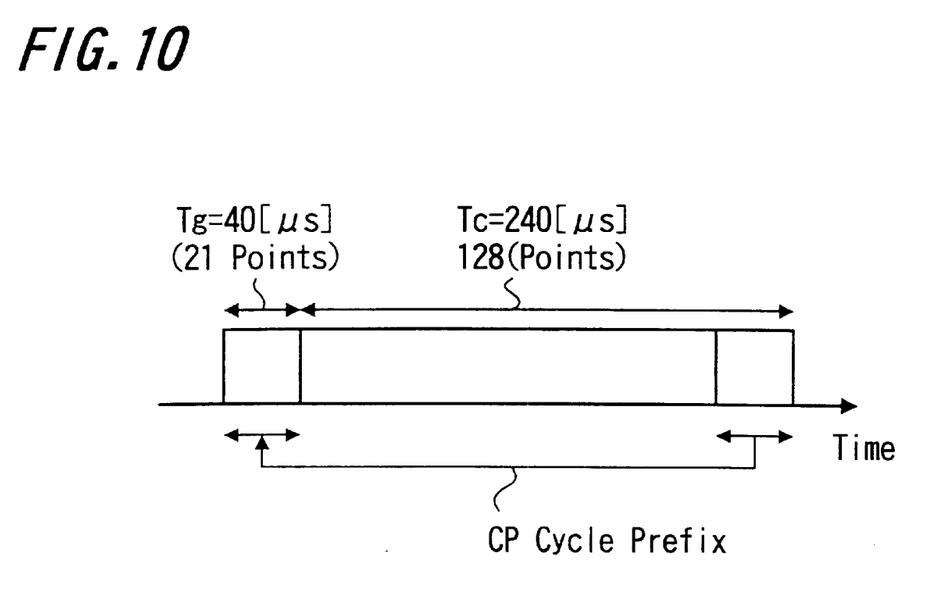
FIG. 10 is a waveform diagram showing an example of windowing data at a transmission time.

The converted data is supplied to a reception windowing data multiplying circuit 115 to be multiplied by reception windowing data. As this reception windowing data, for example, as shown in FIG. 10, a time L (in this case, 240 μs) for selecting 128-point data is set. The received data multiplied by the reception windowing data is supplied to a serial/parallel conversion circuit 116 to be converted into parallel data at every predetermined unit. The converted output is supplied to a Fourier transformation circuit (FFT circuit) 117, and an orthogonal transform process for transforming a frequency axis into a time axis is performed by a calculation process using fast Fourier transformation. The parallel data subjected to orthogonal transformation is supplied to a demultiplexer 118, and predetermined-point data are selected. The selected data is supplied to a parallel/serial conversion circuit 119 to be converted into serial data, and the serial data is supplied to an output terminal 120.

Figure 6:
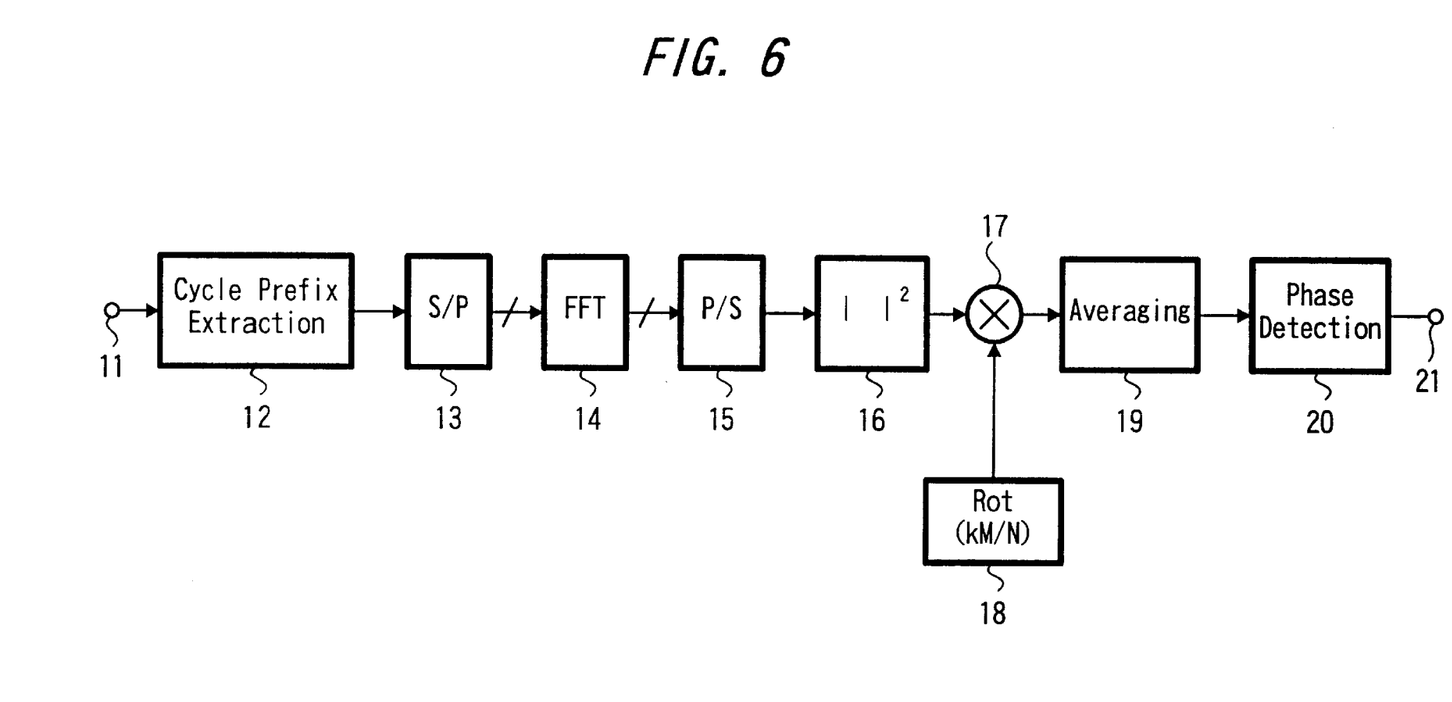
FIG. 6 is a block diagram showing an example of a frequency offset detection circuit according to the first embodiment of the present invention.

In this embodiment, the received data converted by the analog/digital converter 113 is supplied to a frequency offset detection circuit 10. FIG. 6 shows the arrangement of the frequency offset detection circuit 10 of this embodiment. The received data converted by the analog/digital converter 113 is supplied to a cycle prefix extraction circuit 12 through a terminal 11. In the cycle prefix extraction circuit 12, the process of extracting only a cycle prefix component in the received data and setting all the remaining data to be 0 data is performed. More specifically, in this embodiment, the windowing data shown in FIG. 10 is multiplied at a transmission time, and data in which a cycle prefix CP is generated is transmitted. However, in the cycle prefix extraction circuit 12, as shown in, for example, FIG. 7, only 21 points corresponding to the periods $T_g$ (in this case, 40 μs) of cycle prefix components at the start portion and the end portion of one window each are extracted, and all 107-point data therebetween are set to be 0 data.

An output from the cycle prefix extraction circuit 12 is supplied to a serial/parallel conversion circuit 13 to be converted into parallel data, the parallel data is supplied to a Fourier transformation circuit (FFT circuit) 14, and an orthogonal transform process for transforming a frequency axis into a time axis is performed by a calculation process using fast Fourier transformation. The number of points converted by the serial/parallel conversion circuit 13 and the number of points subjected to the transform process by the FFT circuit 14 are determined to be the number of points falling in the range which is sufficiently larger than the number of points corresponding to a repetitive distance of the cycle prefix component. For example, assume that the number of points subjected to the transform process by the FFT circuit 14 is represented by N, and that the number of points corresponding to the repetitive distance of the cycle prefix component is represented by M. In this embodiment, the repetitive distance M=128 points, and the number of transform process points N is set to be four times 128 points, i.e., the number of transform process points N=M×4=128× 4=512.

The parallel data subjected to orthogonal transformation by the FFT circuit 14 is supplied to a parallel/serial conversion circuit 15 to be converted into serial data, and the serial data is supplied to an absolute value square circuit 16. A value is obtained by squaring the absolute value of the serial data. The value squared by the absolute value square circuit 16 is supplied to a multiplier 17 to be multiplied by a multiplying coefficient Rot (kM/N) output from a multiplying coefficient generation circuit 18. The value multiplied by the coefficient in the multiplier 17 is supplied to an averaging circuit 19 to be averaged in the period $T_g$ (in this case, 40 µs) of one cycle prefix component. The averaged value (complex number) is supplied to a phase detection circuit 20. In the phase detection circuit 20, the phase value of the average value is detected, and the detected data is output from a terminal 21. A phase detection value obtained at the terminal 21 becomes a value which is in proportion to an amount of frequency offset of the received OFDM modulation signal. The amount of frequency offset can be judged on the basis of the phase detection value.

It will be described below using equations that a frequency offset can be detected by the circuit shown in FIG. 6. An OFDM modulation signal y(t) on which a frequency offset of v Hz is put is represented by the following equation.

$$y(t) = \sum_{k=a}^{b} x_k rot(kf_c t) w(t) rot(vt) \qquad (9)$$

Figure 7:
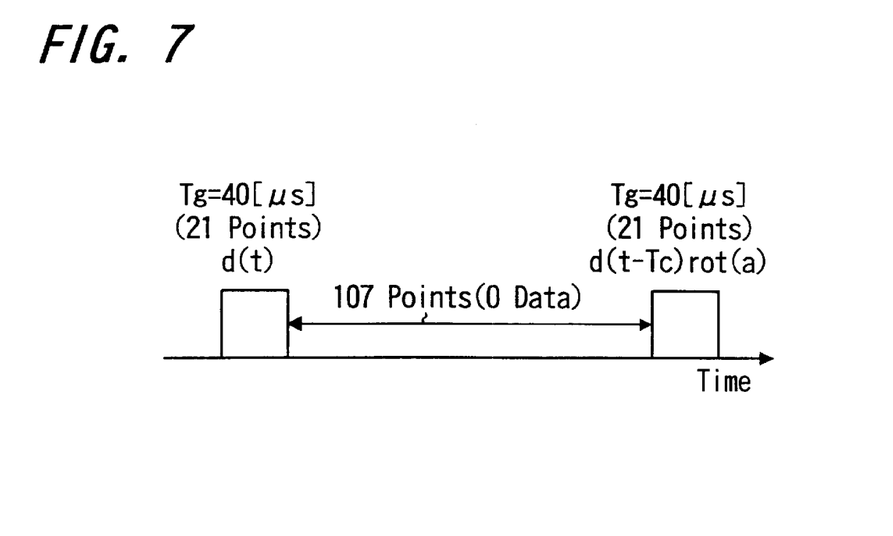
FIG. 7 is a an explanatory diagram showing an example of an extraction state of a cycle prefix component according to the first embodiment of the present invention.

The component of a cycle prefix CP is extracted from this OFDM modulation signal by the cycle prefix extraction circuit 12, and all the remaining data are set to be 0 data. The data extracted by the cycle prefix extraction circuit 12 is represented by the following equation. In this equation, as shown in FIG. 7, a cycle prefix CP at the start portion is represented by d(t), and a cycle prefix CP at the end portion is represented by $d(t-T_c)rot(a)$.

$$z(t)=(c(t)+c(t-T_c))rot(vt)=c(t)rot(vt)+c(t-T_c)rot(v(t-T_c))rot(vT_c)d(t)=c(t)rot(vt)a=vT_c z(t)=d(t)+d(t-T_c)rot(a) \qquad (10)$$

The signal represented by Equation (10) is subjected to Fourier transformation by the FFT circuit 14 to obtain Equation (11).

$$z(f)=D(f)+D(f)rot(-fT_c)rot(a)=D(f)(1+rot(-fT_c+a)) \qquad (11)$$

In addition, when the square of the absolute value of the resultant value obtained by the Fourier transformation is calculated by the absolute value square circuit 16, a value given by Equation (12) is obtained.

$$|Z(f)|^2|D(f)|^2(1+rot(-fT_c+a)+rot(fT_c-a)=2|D(f)|^2(1+\cos(2\pi fT_c-2\pi a)) \qquad (12)$$

Figure 13:
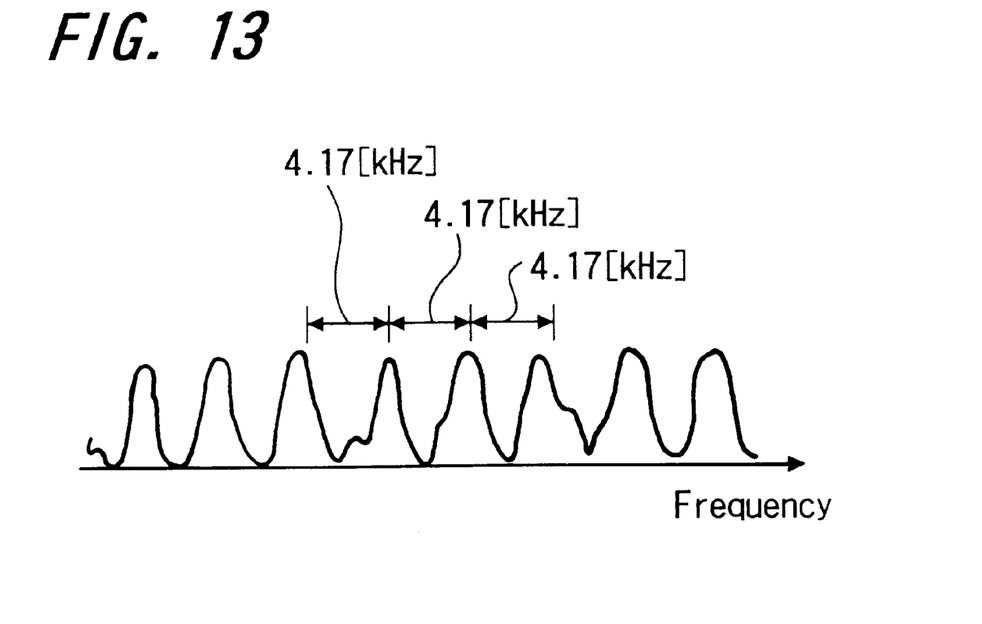
FIG. 13 is a graph of frequency characteristics showing an example of a received OFDM modulation signal.

In Equation (12), since it is supposed that $|D(f)|^2$ may have almost white spectrum, the value obtained by squaring the absolute value is a signal having a profile shown in FIG. 13 on a frequency axis. This signal is a signal having no negative value, and is a signal having periodicity at an interval of 4.1666 kHz which is a sub-carrier interval. If there is a frequency offset therein, the waveform also shifts by the frequency offset amount. Therefore, when a periodic component of the signal is extracted, and the period component is multiplied by rot(fTc) in the multiplier 17, a value given by the following equation is obtained.

$$q(f) = |Z(f)|^2 rot(fT_c) \qquad (13)$$
$$= 2|D(f)|^2(1 + rot(-fT_c + a) + rot(fT_c - a))rot(fT_c)$$
$$= 2|D(f)|^2(rot(fT_c) + rot(a) + rot(2fT_c - a))$$

A signal obtained by Equation (13) is averaged on a frequency axis by the averaging circuit 19. When this averaging process is represented by E[], the average value of q is represented by the following equation.

$$\hat{q}=E[q(f)]^2=E[|D(f)|^2(rot(fT_c)+rot(a)+rot(2fT_c-a))]=E[|D(f)|^2|rot(fT_c)]+E[|D(f)|^2 rot(a)]+E[|D(f)|^2 rot(2fT_c-a)]=rot(a) \qquad (14)$$

The value rot(a) given by the above equation is a predetermined value, and the value a is an amount which is in proportion to a frequency offset. For this reason, a frequency offset v is represented by Equation (15).

$$v=a/T_c=rot^{-1}(\hat{q})/T_c \qquad (15)$$

As described above, according to the frequency offset detection circuit shown in FIG. 6, a frequency offset can be used as a coefficient. Therefore, with a simple arrangement in which squaring of the absolute value of a value subjected to Fourier transformation and a phase detection process are performed, a precise frequency offset can be detected.

In this embodiment, assume that the number of points subjected to a transformation process by the FFT circuit 14 is represented by N, and that the number of points corresponding to the repetitive distance of the cycle prefix component is represented by M. In this case, the number of transform process points N of Fourier transformation is set to be four times the repetitive distance M of the cycle prefix component. For this reason, a simple arrangement which does not require the multiplier 17 and the multiplying coefficient generation circuit 18 shown in FIG. 6 can also be used.

Figure 8:
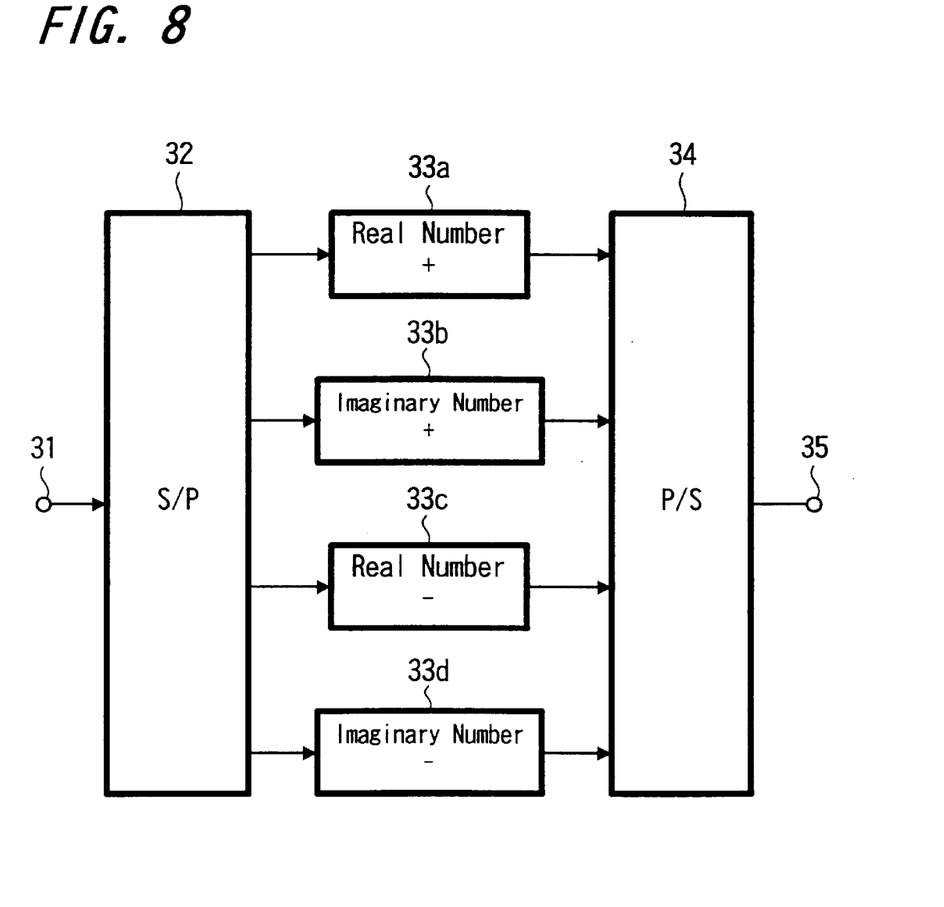
FIG. 8 is a block diagram showing an arrangement of a phase detection multiplier unit according to the first embodiment of the present invention.
Figure 9:
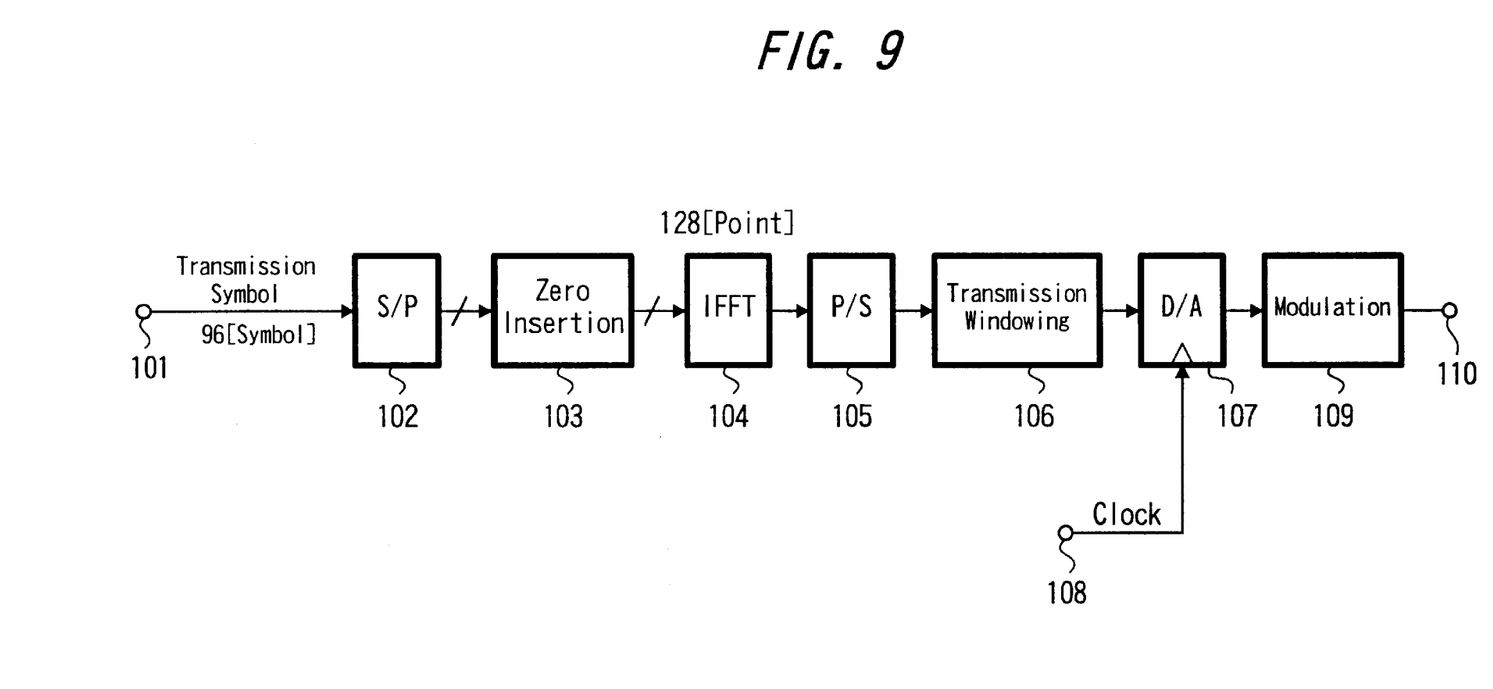
FIG. 9 is a block diagram showing a transmission arrangement for an OFDM signal according to the present invention.

More specifically, when the number of transform points N of Fourier transformation is set to be four times the repetitive distance M of the cycle prefix component, a multiplying coefficient Rot(kM/N) generated by the multiplying coefficient generation circuit 18 is Rot(k/4). An arrangement in which multiplying is not performed can be used. An example of a circuit which can be replaced with the multiplier 17 is shown in FIG. 8. When a value obtained by squaring an absolute value can be obtained at a terminal 31, data obtained at the terminal 31 is supplied to a serial/parallel conversion circuit 32 to be four series of parallel data. The series of data are supplied to sign selection circuits 33a, 33b, 33c, and 33d, respectively. The sign selection circuits 33a, 33b, 33c, and 33d perform processes of selecting different states (real-number value or imaginary-number value and positive or negative), respectively. For example, the sign selection circuit 33a sets a real-number value and a positive sign, the sign selection circuit 33b sets an imaginary-number value and a positive sign, the sign selection circuit 33c sets a real-number value and a negative sign, and the sign selection circuit 33d sets an imaginary-number value and a negative value.

Outputs from the respective sign selection circuits 33a, 33b, 33c, and 33d are supplied to a parallel/serial conversion circuit 34 to be returned to serial data, and the serial data is supplied from a terminal 35 to the averaging circuit 19 (see FIG. 6).

In this manner, when the number of transform points N of Fourier transformation is set to be four times the repetitive distance M of the cycle prefix component, the present invention can be realized by only selection of the real part or imaginary part of a signal and a sign inversion process in place of a multiplying process.

Figure 15A:
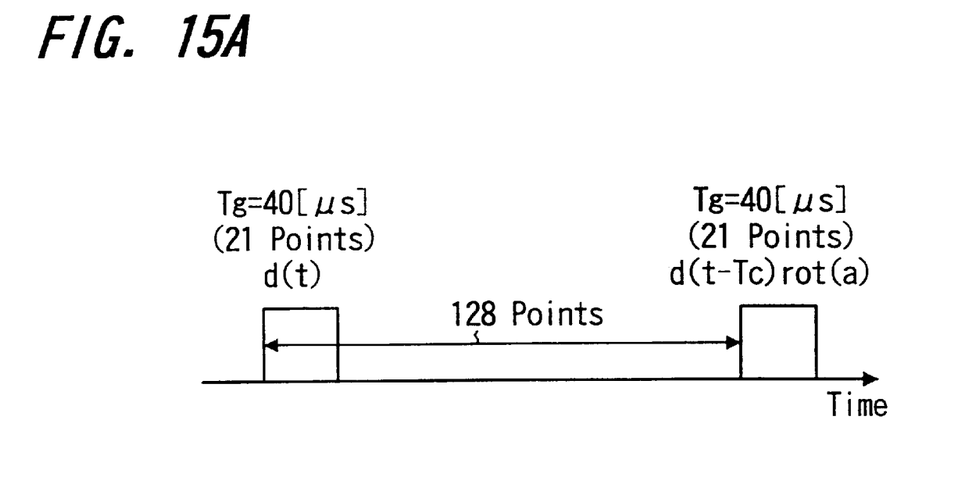
FIG. 15A and 15B are each an explanatory diagram showing an example of an extraction state and a shift state of a cycle prefix component according to the second embodiment of the present invention.
Figure 15B:
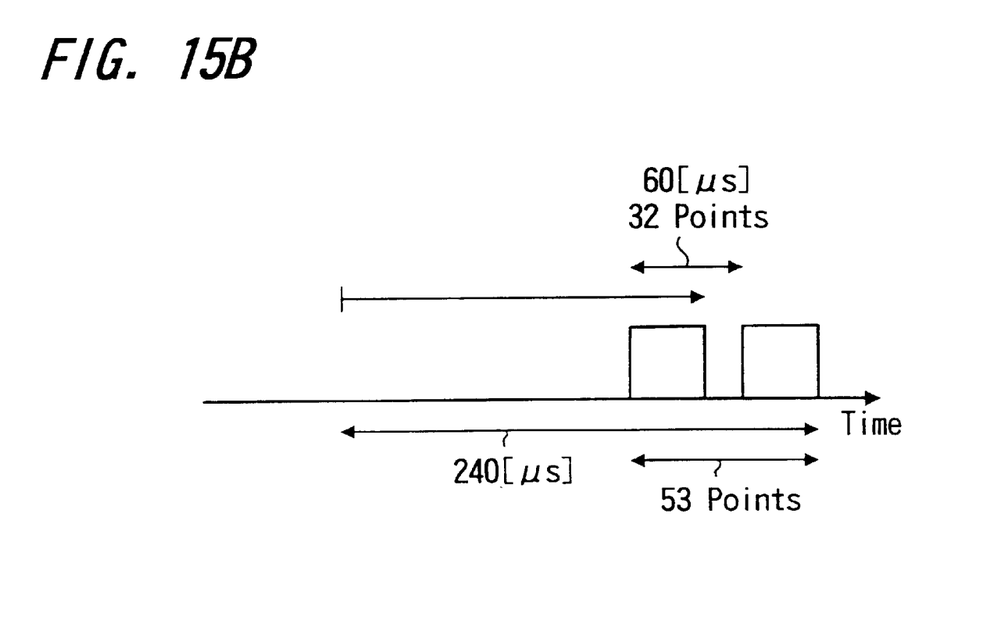

A second embodiment of the present invention will be described below with reference to FIGS. 14 to 15.

In this embodiment, as in the first embodiment described above, the present invention is applied to a receiving apparatus which performs a receiving process for an OFDM modulation signal.

Figure 11:
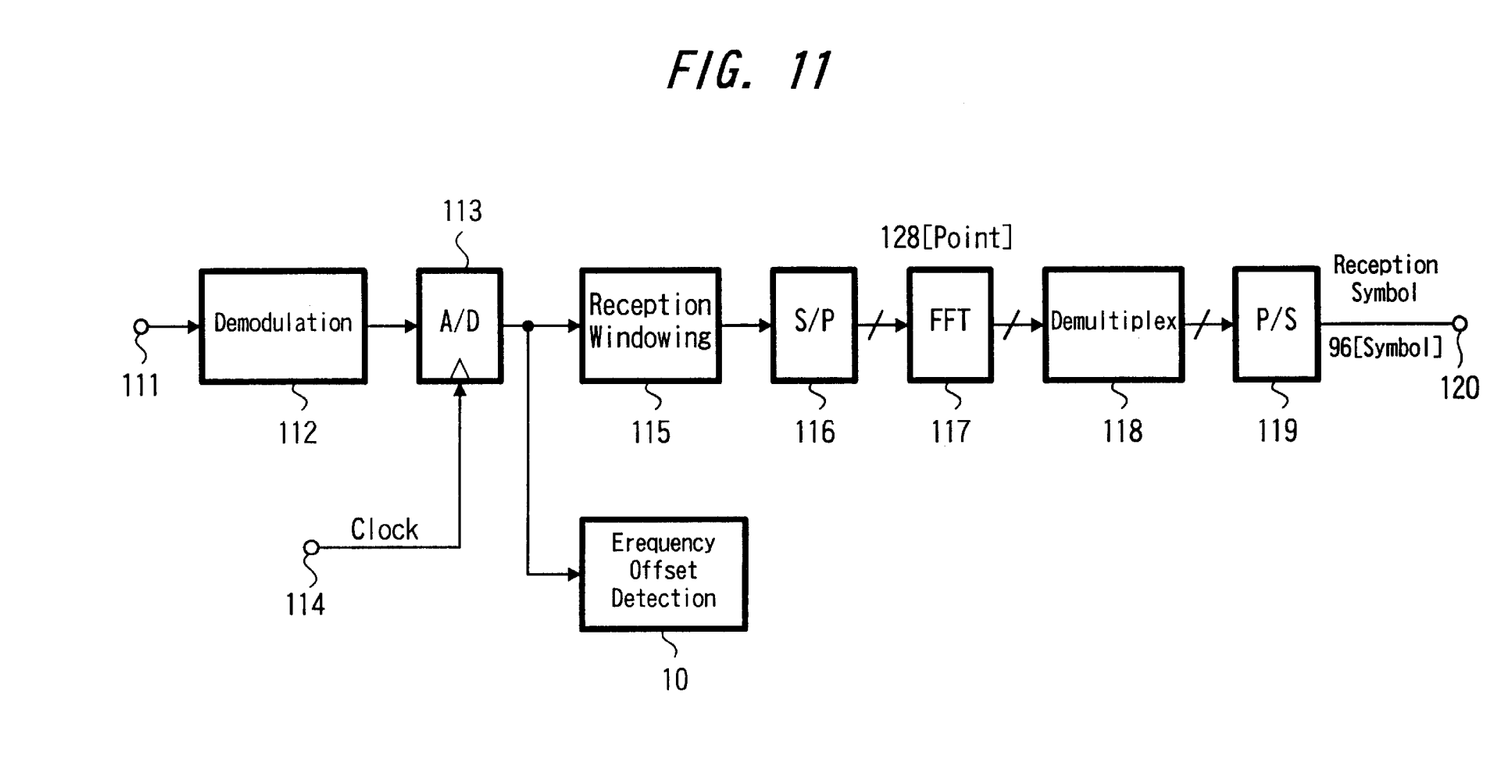
FIG. 11 is a block diagram showing a reception arrangement for an OFDM signal according to the present invention.
Figure 12:
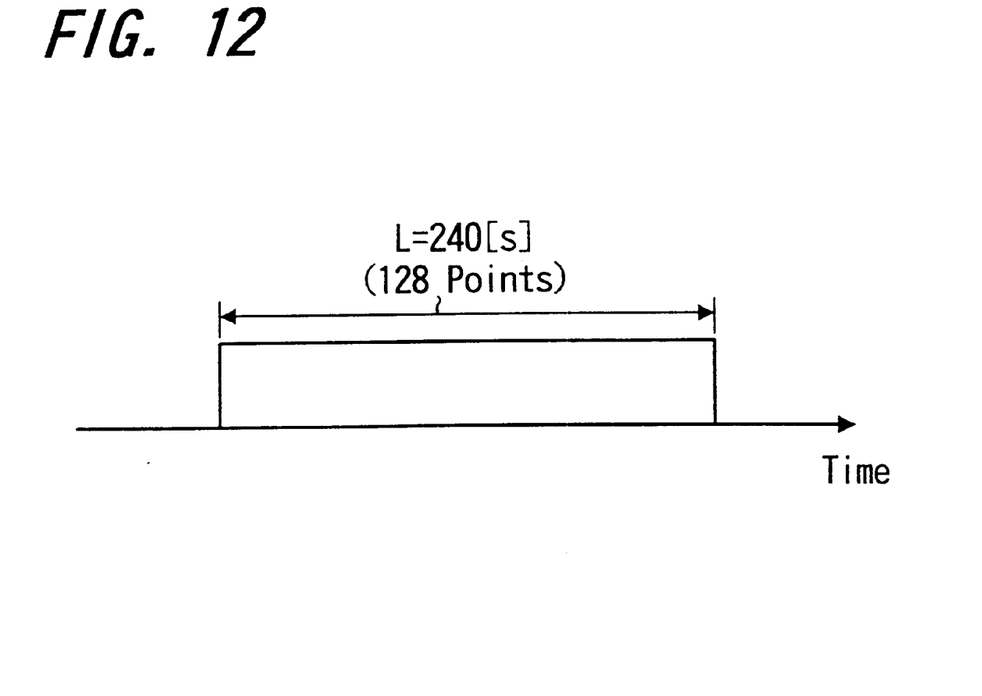
FIG. 12 is a waveform diagram showing an example of windowing data at a reception time.

The entire arrangement of a receiving apparatus according to this embodiment is the same as the arrangement shown in FIG. 11 and described in connection with the first embodiment described above. The number of sub-carriers (96) of a received OFDM modulation signal and a sub-carrier interval (4.1666 kHz) are set to be same as those in the embodiment described above.

FIG. 14 shows the arrangement of a frequency offset detection circuit according to this embodiment. This arrangement will be described below. Received data converted by the analog/digital converter 113 shown in FIG. 11 is supplied to a cycle prefix extraction circuit 42 through a terminal 41. In the cycle prefix extraction circuit 42, the process for extracting only a cycle prefix component in the received data and setting all the data of the remaining portion to be 0 data is performed. This process is the same process as described in the cycle prefix extraction circuit 12 in the first embodiment. Data constituted by only a cycle prefix CP at the start portion and a cycle prefix CP at the end portion shown in FIG. 15A is obtained. At this time, a repetitive interval of the cycle prefixes CP has 128 points (240 μs as time).

In this embodiment, a signal extracted by the cycle prefix extraction circuit 42 is supplied to a waveform slide circuit 43, and the position of the cycle prefix at the start portion is slid to a position near the cycle prefix CP at the end portion. For example, as shown in FIG. 15B, the repetitive interval between two cycle prefixes CP is set to be 32 points (60 μs as time), and the number of points from the front end portion of the cycle prefix on the start side to the rear end portion of the cycle prefix on the end side is set to be 53 points.

An output from the waveform slide circuit 43 is supplied to a serial/parallel conversion circuit 44 to be converted into parallel data, the parallel data is supplied to a Fourier transformation circuit (FFT circuit) 45, and an orthogonal transform process for transforming a frequency axis into a time axis is performed by a calculation process using fast Fourier transformation. The number of points converted by the serial/parallel conversion circuit 44 and the number of points subjected to the transform process by the FFT circuit 45 are determined to be the number of points falling in the range which is sufficiently larger than the number of points corresponding to a repetitive distance of the cycle prefix component. For example, assume that the number of points subjected to the transform process by the FFT circuit 45 is represented by N, and that the number of points corresponding to the repetitive distance of the cycle prefix component is represented by M. In this embodiment, the repetitive distance M is set to be 32 points, and the number of transform process points N is set to be four times 32 points, i.e., the number of transform process points N=M×4=32×4=128.

The parallel data orthogonally transformed by the FFT circuit 45 is supplied to a parallel/serial conversion circuit 46 to be converted into serial data, and the serial data is supplied to an absolute value square circuit 47. A value is obtained by squaring the absolute value of the serial data. The value squared by the absolute value square circuit 47 is supplied to a multiplier 48 to be multiplied by a multiplying coefficient Rot (kM/N) (Rot(k/4) when N is four times M as described above) output from a multiplying coefficient generation circuit 49. The value multiplied by the coefficient in the multiplier 48 is supplied to an averaging circuit 50 to be averaged in a period $T_g$ (in this case, 40 μs,) of one cycle prefix component. The averaged value (complex number) is supplied to a phase detection circuit 51. In the phase detection circuit 51, the phase value of the average value is detected, and the detected data is output from a terminal 52. A phase detection value obtained at the terminal 52 becomes a value which is in proportion to an amount of frequency offset of the received OFDM modulation signal. The amount of frequency offset can be determined on the basis of the phase detection value.

The principle that a frequency offset can be detected by the arrangement of this embodiment is the same principle as described in Equation (9) to Equation (15) in the first embodiment described above, and a precise frequency offset can be preferably detected as in the first embodiment. In this embodiment, since the repetitive interval of cycle prefix components is shortened, the number of transform points in the Fourier transformation circuit 45 can be considerably reduced. The arrangement of the Fourier transformation circuit, and the serial/parallel conversion circuit and the parallel/serial conversion circuit arranged before and after the Fourier transformation circuit can be considerably simplified. A processing amount required for a calculation process can also be considerably reduced.

Also in the second embodiment, when the number of transform points N subjected to Fourier transformation is set to be four times the repetitive distance M of the cycle prefix component, in place of an arrangement for performing a coefficient multiplier, as shown in FIG. 8 described in the first embodiment, an arrangement for performing selection of a real number or an imaginary number and sign inversion can also be used. When this arrangement shown in FIG. 8 is applied, the arrangement of the frequency offset detection circuit can be simplified.

A third embodiment of the present invention will be described below with reference to FIG. 16.

In this embodiment, as in the first and second embodiments described above, the present invention is applied to a receiving apparatus for performing a receiving process for an OFDM modulation signal.

A receiving apparatus according to this embodiment is an example of a base station which simultaneously performs receiving processes of OFDM modulation signals from a plurality of mobile stations which are divided in bands and multi-connected (for example, a base station in a state shown in FIG. 1 as a prior art). In this case, the receiving apparatus has an arrangement which simultaneously receives signals from four mobile stations.

Figure 16:
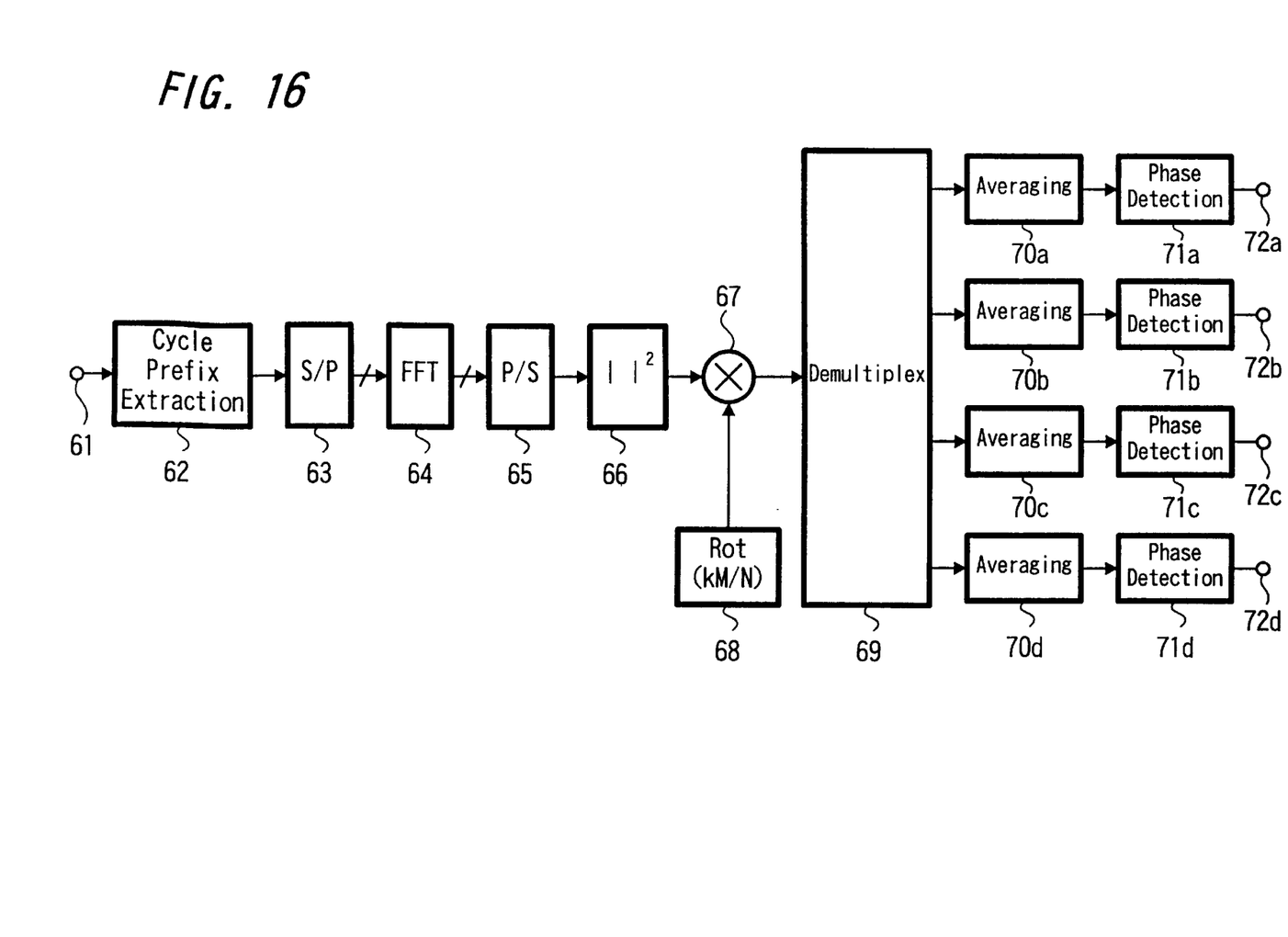
FIG. 16 is a block diagram showing an example of a frequency offset detection circuit according to the third embodiment of the present invention.

FIG. 16 shows the arrangement of a frequency offset detection circuit according to this embodiment. This arrangement will be described below. Received data converted into digital data by an analog/digital converter (circuit corresponding to the analog/digital converter 113 in FIG. 11;

Note that the circuit must be capable of simultaneously processing signals from a plurality of stations) of a circuit of a receiving system is supplied to a cycle prefix extraction circuit 62 through a terminal 61. In the cycle prefix extraction circuit 62, the process of extracting only a cycle prefix component in the received data and setting all the data of the remaining portion to be 0 data is performed. This process is the same process as described in the cycle prefix extraction circuit 12 in the first embodiment. At this time, as described in the second embodiment, a waveform slid circuit may be provided to shorten a repetitive intervals of cycle prefixes CP.

An output from the cycle prefix extraction circuit 62 is supplied to a serial/parallel conversion circuit 63 to be converted into parallel data, the parallel data is supplied to a Fourier transformation circuit (FFT circuit) 64, and an orthogonal transform process for transforming a frequency axis into a time axis is performed by a calculation process using fast Fourier transformation. The number of points converted by the serial/parallel conversion circuit 63 and the number of points subjected to the transform process by the FFT circuit 64 are determined to be the number of points falling in the range which is sufficiently larger than the number of points corresponding to a repetitive distance of the cycle prefix component output from the cycle prefix extraction circuit 62.

The parallel data orthogonally transformed by the FFT circuit 64 is supplied to a parallel/serial conversion circuit 65 to be converted into serial data, and the serial data is supplied to an absolute value square circuit 66. A value is obtained by squaring the absolute value of the serial data. The value squared by the absolute value square circuit 66 is supplied to a multiplier 67 to be multiplied by a multiplying coefficient Rot (kM/N) output from a multiplying coefficient generation circuit 68.

In this embodiment, the signal multiplied by the coefficient in the multiplier 67 is supplied to a demultiplexer 69 to be divided into four signals in frequency bands (at every predetermined number of points) of an original signal. The respective divided signals are supplied to different averaging circuits 70a, 70b, 70c, and 70d, and averaging of a period $T_g$ (in this case, 40 $\mu$s) of one cycle prefix component is performed in each circuit. The averaged values (complex numbers) are supplied to different phase detection circuits 71a to 71d, respectively. The phase detection circuits 71a to 71d detect phase values of the average values, and the detected data are output from output terminals 72a to 72d of the phase detection circuits 71a to 71d, respectively. Phase detection values obtained from the output terminals 72a to 72d become values which are in proportion to amounts of frequency offsets of the received OFDM modulation signals from the stations. The amounts of frequency offset of the signals transmitted from the respective mobile stations can be independently determined.

The principle that a frequency offset can be detected by the arrangement of this embodiment is the same principle as described in Equation (9) to Equation (15) in the first embodiment described above, and a precise frequency offset can be preferably detected as in the first embodiment. In this embodiment, since signals from a plurality of mobile stations are simultaneously processed in the arrangement used until coefficient multiplying is performed, these signals need not be processed by respectively arranging circuits for signals from the respective mobile stations. With a very simple arrangement, frequency offsets of the OFDM modulation signals simultaneously transmitted from a plurality of stations can be detected.

Also in the third embodiment, as described in the second embodiment, when the repetitive interval of cycle prefix components is shortened, the remaining portion can also be used in the arrangement of a Fourier transformation circuit.

In addition, when the number of transform points N subjected to Fourier transformation is set to be four times the number of points M corresponding to the repetitive distance of the cycle prefix component, in place of an arrangement for performing a coefficient multiplier, as shown in FIG. 8 described in the first embodiment, an arrangement for performing selection of a real number or an imaginary number and sign inversion can also be used. When this arrangement shown in FIG. 8 is applied, the arrangement of the frequency offset detection circuit can be simplified further.

In the arrangement shown in FIG. 16 and described in the third embodiment, the process of dividing signals from the respective stations is performed after the signals are multiplied by a coefficient. However, when the dividing process is performed to the signal (output signal from the parallel/serial conversion circuit 65 or output signal from the absolute value square circuit 66) subjected to at least Fourier transformation, the circuit arrangement can be advantageously simplified by simultaneously processing signals from a plurality of stations.

According to the receiving method as described above, a phase value of a value of periodicity of an envelope of a detected absolute value square value becomes a value which is in proportion to a frequency error of an OFDM modulation signal, and the frequency error of the received OFDM modulation signal can be easily determined on the basis of the phase value.

According to the receiving method as described above, the periodicity of the envelope of the absolute value square value is detected, and, as a calculation process for the phase of the periodicity, a process of performing orthogonal detection at (1/period) of the signal, then averaging the detected signal, and calculating a phase of an output complex number is performed. Therefore, the phase value which is in proportion to a frequency error can be detected by a simple process using orthogonal detection, averaging, and a phase detection process.

According to the receiving method as described above, a time interval between two signal components constituting the extracted cycle prefix component is narrowed, and the Fourier transformation is performed to the cycle prefix component in the narrowed time range. Therefore, the number of transform points in the Fourier transformation can be reduced in accordance with the narrowed time range, and an amount of transform process in the Fourier transformation can be decreased.

According to the receiving method as described above, when the time interval between the two signal components constituting the cycle prefix component is narrowed, the Fourier transformation is performed in a time range which is four times a shortened repetitive time, and a cycle used when the periodicity of the envelope of the absolute value square value of the signal subjected to the Fourier transformation is set to be 4. Therefore, a process for phase detection can be performed by only selection of a real number or an imaginary number and sign inversion, and phase detection can be performed by a simple process.

According the receiving method as described in above, when signals multi-connected in bands are used as the received OFDM modulation signal, the signals in the bands are separated after the Fourier transformation, and a phase is detected on the basis of an averaged value of each of the separated signals. Therefore, received data in a plurality of bands can be simultaneously processed until at least Fourier transformation is performed, and frequency offset detection of the multi-connected signals can be performed by a simple process.

According to the receiving apparatus as described above, a phase value detected by phase detection means becomes a value which is in proportion to a frequency error of an OFDM modulation signal, the frequency error can be determined on the basis of the phase value, and the frequency error of the received OFDM modulation signal can be determined by a simple arrangement for detecting a phase.

According to the receiving apparatus as described above, in order to detect the periodicity of the envelope by the periodicity detection means, the signal is orthogonally detected at (1/period) by the orthogonal detection means, an average value of the orthogonally detected signal is calculated by an average value calculation means, and a phase of a complex number serving as an output from the average value calculation means is detected by the phase detection means. Therefore, a phase value which is in proportion to the frequency error can be detected by a simple arrangement constituted by the Fourier transformation means, the average value calculation means, and the phase detection means.

According to the receiving apparatus as described above, a cycle prefix component shift means for narrowing a time interval between two signal components constituting the extracted cycle prefix component is provided, and an output from the cycle prefix component shift means is supplied to the Fourier transformation means. Therefore, the number of transform points in the Fourier transformation means can be decreased in accordance with the shifted time interval, and a simple arrangement having a small number of transform points can be used as the Fourier transformation means.

According to the receiving apparatus as described above, Fourier transformation is performed by the Fourier transformation means in a time range which is four times a repetitive time of a cycle prefix component output by the cycle prefix component shift means, and a cycle used in detection performed by the periodicity detection means is set to be 4. Therefore, a process arrangement for phase detection can be realized by only selection of a real number or an imaginary number and sign inversion, and phase detection can be performed by a simple arrangement.

According to the receiving apparatus as described above, a separation means for separating a signal subjected to Fourier transformation by the Fourier transformation means at a predetermined band is provided, and the signals separated by the separation means are independently processed by the periodicity detection means and the phase detection means. Therefore, an arrangement which simultaneously processes received data in a plurality of bands until at least Fourier transformation means can be used, and frequency offsets of respective transmitted signals which are multi-connected can be detected by a simple arrangement.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A receiving method comprising the steps of:
   extracting a cycle prefix component of a received orthogonal frequency division multiplex modulation signal;
   Fourier transforming the extracted cycle prefix component;
   calculating an absolute square value of the component; and
   detecting periodicity of an envelope of the calculated absolute square value to determine a frequency error of the orthogonal frequency division multiplex modulation signal on the basis of the a phase of the detected periodicity.

2. The receiving method according to claim 1, wherein a calculation process for determining the phase of the periodicity includes performing orthogonal detection at a known frequency of the received signal, averaging the orthogonally detected signal, and calculating a phase of an output complex number.

3. The receiving method according to claim 1, further comprising the steps of:
   narrowing a time interval between two signal components constituting the extracted cycle prefix component, and
   performing a Fourier transformation on the cycle prefix component in the narrowed time interval.

4. The receiving method according to claim 3, wherein when the time interval between the two signal components constituting the cycle prefix component is narrowed,
   the Fourier transformation is performed in a time range which is four times a shortened repetitive time, and
   a cycle used when the periodicity of the envelope of the absolute square value of the signal subjected to the Fourier transformation is set to be 4.

5. The receiving method according to claim 1, wherein when signals multi-connected in bands constitute the received orthogonal frequency division multiplex modulation signal,
   the signals in the bands are separated after the step of performing the Fourier transformation, and
   absolute square values of the separated respective signals are orthogonally detected, and the phase is detected on the basis of an averaged value thereof.

6. A receiving apparatus comprising:
   cycle prefix component extraction means for extracting a cycle prefix component of a received orthogonal frequency division multiplex modulation signal;
   Fourier transformation means for Fourier transform detecting the cycle prefix component extracted by the extracting means;
   absolute value square means for calculating an absolute value square of the component transformed by the Fourier transformation means;
   periodicity detection means for detecting periodicity of an envelope from an output of the absolute value square means; and
   phase detection means for detecting a phase of an output from the periodicity detection means.

7. The receiving apparatus according to claim 6, wherein in order to detect the periodicity of the envelope by the periodicity detection means,
   a signal is orthogonally detected at a known frequency of the received signal by orthogonal detecting means,
   an average value of the orthogonally detected signal is calculated by average value calculation means, and
   a phase of a complex number forming an output from the average value calculation means is detected by the phase detection means.

8. The receiving apparatus according to claim 6, further comprising:
   cycle prefix component shift means for narrowing a time interval between two signal components constituting the extracted cycle prefix component, and
   an output from the cycle prefix component shift means is supplied to the Fourier transformation means.

9. The receiving apparatus according to claim 8, wherein Fourier transformation is performed by the Fourier transformation means in a time range which is four times a repetitive time of a cycle prefix component output by the cycle prefix component shift means, and
   a cycle used in detection performed by the periodicity detection means is set to be 4.

10. The receiving apparatus according to claim 6, further comprising separation means for separating a signal subjected to the Fourier transformation by the Fourier transformation means at a predetermined band, and the signals separated by the separation means are independently processed by the periodicity detection means and the phase detection means.

* * * * *